(12) United States Patent
Sewell

(10) Patent No.: US 10,743,149 B2
(45) Date of Patent: Aug. 11, 2020

(54) SYSTEMS AND METHODS FOR CHECKOUT LINE UTILITY PAYMENTS

(71) Applicant: ENERGYCOMNETWORK, INC., Alpharetta, GA (US)

(72) Inventor: Ronald R. Sewell, Alpharetta, GA (US)

(73) Assignee: ENERGYCOMNETWORK, INC., Alpharetta, GA (US)

( * ) Notice: Subject to any disclaimer, the term of this patent is extended or adjusted under 35 U.S.C. 154(b) by 708 days.

(21) Appl. No.: 15/087,447

(22) Filed: Mar. 31, 2016

(65) Prior Publication Data

US 2016/0292658 A1 Oct. 6, 2016

Related U.S. Application Data

(60) Provisional application No. 62/140,845, filed on Mar. 31, 2015.

(51) Int. Cl.
| | |
|---|---|
| *G06Q 50/06* | (2012.01) |
| *H04W 4/14* | (2009.01) |
| *G06Q 20/32* | (2012.01) |
| *G06Q 20/10* | (2012.01) |
| *G06Q 20/20* | (2012.01) |

(52) U.S. Cl.
CPC ............ *H04W 4/14* (2013.01); *G06Q 20/102* (2013.01); *G06Q 20/202* (2013.01); *G06Q 20/208* (2013.01); *G06Q 20/3274* (2013.01); *G06Q 50/06* (2013.01)

(58) Field of Classification Search
CPC ............... G06Q 20/204; G06Q 20/102; G06Q 20/3274; G06Q 50/06

USPC ............... 705/17, 21, 34, 38, 26.1, 44, 412; 235/375, 379; 340/870.02

See application file for complete search history.

(56) References Cited

U.S. PATENT DOCUMENTS

| | | | | |
|---|---|---|---|---|
| 8,694,438 | B1* | 4/2014 | Jernigan | G06Q 20/204 705/67 |
| 9,911,109 | B2* | 3/2018 | Hajji | G06Q 20/20 |
| 2002/0147685 | A1* | 10/2002 | Kwan | G06Q 20/04 705/44 |
| 2004/0243524 | A1* | 12/2004 | Crichlow | G01D 4/004 705/412 |
| 2009/0319393 | A1* | 12/2009 | Gulliver | G06Q 20/346 705/26.1 |
| 2010/0125522 | A1* | 5/2010 | Thomas | G06Q 20/20 705/44 |
| 2010/0131397 | A1* | 5/2010 | Killian | G06Q 20/32 705/35 |
| 2010/0205063 | A1* | 8/2010 | Mersky | G06Q 20/02 705/17 |

(Continued)

*Primary Examiner* — Vanel Frenel
(74) *Attorney, Agent, or Firm* — Troutman Sanders LLP; Christopher C. Close, Jr.

(57) ABSTRACT

In an example implementation of the disclosed technology, a system is provided by which a utility company customer can make a payment to the utility company via a point of sale (POS) system at a retailer such as a grocery store or clothing store. In some embodiments, the utility company provides to the user a barcode that includes information relating to the customer's account, and the customer can present the barcode to the POS system or a retail agent in the course of checking out at the retailer. Accordingly, the customer can pay a utility bill in the course of paying for, for example, groceries.

20 Claims, 4 Drawing Sheets

(56) References Cited

U.S. PATENT DOCUMENTS

| | | | |
|---|---|---|---|
| 2012/0116933 A1* | 5/2012 | Matthews | G06Q 10/04 |
| | | | 705/30 |
| 2012/0187184 A1* | 7/2012 | Challa | G06K 19/06112 |
| | | | 235/375 |
| 2014/0310167 A1* | 10/2014 | Meyer | G06Q 20/04 |
| | | | 705/40 |
| 2014/0379578 A1* | 12/2014 | Chan | G06Q 20/322 |
| | | | 705/44 |
| 2015/0088674 A1* | 3/2015 | Flurscheim | G06Q 20/3276 |
| | | | 705/17 |
| 2015/0142647 A1* | 5/2015 | Johnson | G06Q 20/102 |
| | | | 705/40 |
| 2016/0048818 A1* | 2/2016 | Tulluri | G06Q 20/10 |
| | | | 705/43 |

* cited by examiner

SYSTEMS AND METHODS FOR CHECKOUT LINE UTILITY PAYMENTS

CROSS-REFERENCE TO RELATED APPLICATION AND PRIORITY CLAIM

This application claims the benefit, under 35 U.S.C. § 119(e), of U.S. Provisional Patent Application No. 62/140,845, filed 31 Mar. 2015, entitled "SYSTEMS AND METHODS FOR CHECKOUT LINE UTILITY PAYMENTS," the entire content and substance of which is incorporated herein by reference in its entirety as if fully set forth below.

BACKGROUND

Often, customers of utility companies do not have a computer or internet access to allow them to pay their utility company bill. Further, it is not always an option for a utility company customer to travel to a utility company facility that accepts payments. For example, the customer's work schedule may conflict with the times at which the utility company facility accepts walk-in payments. Or, the customer may not have access to transportation that would allow the customer to travel to the utility company facility and pay an outstanding bill. Accordingly, what is needed is a system that would afford utility company customers more flexibility in paying their utility company bill.

SUMMARY

Some or all of the above needs may be addressed by certain implementations of the disclosed technology. According to an example implementation, a system is provided that allows a utility system customer to make a payment to the utility company using a retailer's point of sale system. The system may allow the customer to present to the POS system a barcode received from the utility company. The barcode may comprise information relating to the user's account with the utility company and unique business rules of the specific utility. Upon scanning the barcode, the POS system may contact a payment processor/aggregator, which can apply utility company rules to the customer's request and send information back to the POS system. The POS system can then receive payment from the customer and send confirmation of payment to the payment processor/aggregator, which can create a shadow post or an immediate direct post that can be posted to the user's account. Further, the payment processor/aggregator can create a payment confirmation, which can be transmitted to the user.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
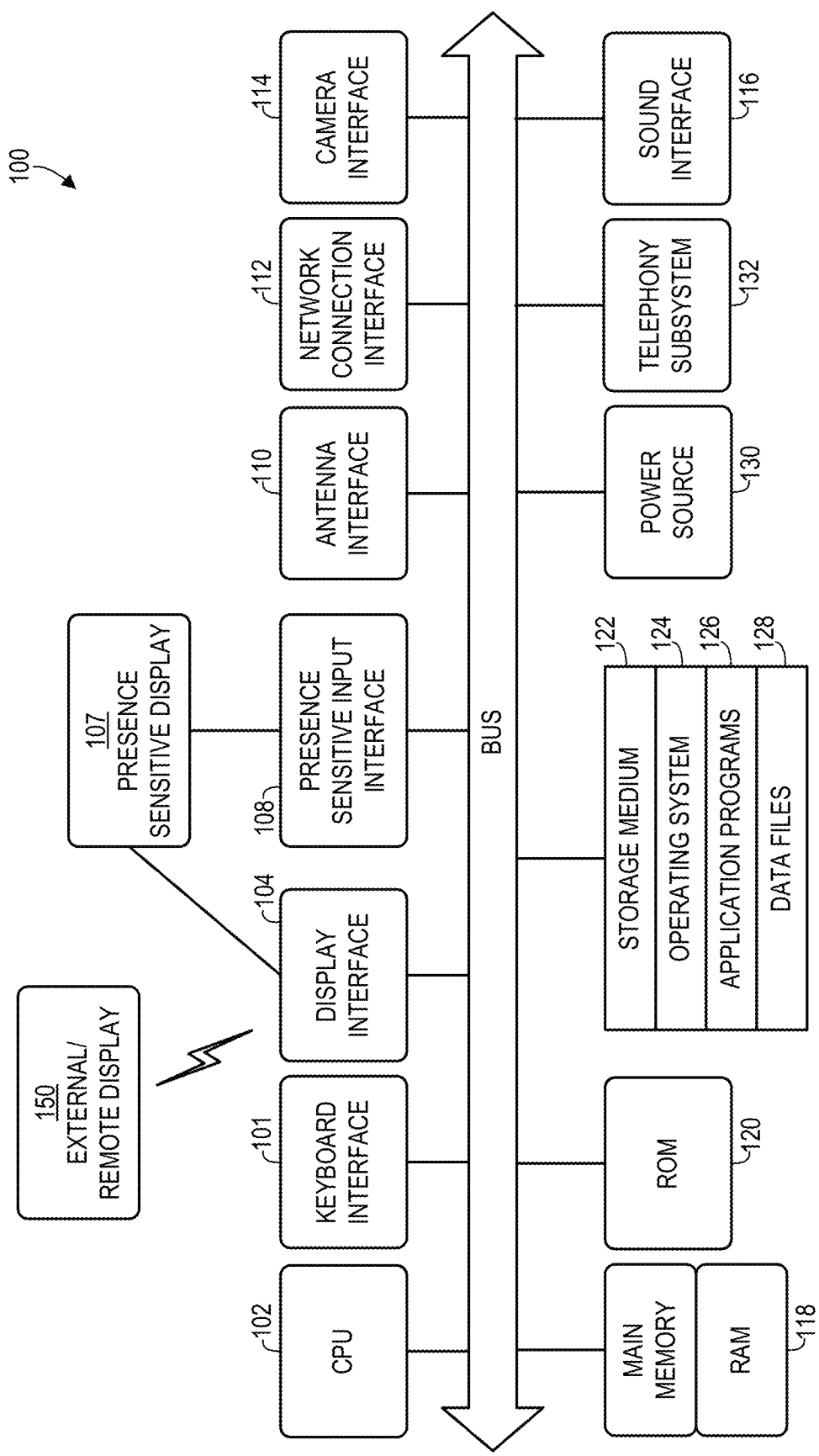
FIG. 1 is a block diagram of an illustrative computer system architecture 100, according to an example implementation.

Utility companies typically offer their customers payment methods that allow the customers to make payments that post to their account nearly instantaneously in lieu of traditional payments that are received via U.S. Mail. For example, utility companies typically offer customers an online portal by which the customer can make a payment that immediately posts to their account. Similarly, utility companies often provide payment kiosks and/or customer service representatives that can take the customer's payment, which will then post to the customer's account. Such payment options allow customers to keep their account current in situations where, for example, failure to make immediate payment would result in a loss of services. Often, however, customers most in need of such services are unable to take advantage of them. For example, a customer may not have access to an internet-accessible computing device that would allow the customer to pay their bill through the utility company's web portal. Further, the customer may not have access to transportation that would allow the customer to travel to the utility company's facility to pay the bill in person or at the kiosk. Furthermore, a customer may not have a bank account or bank cards (e.g., credit card or debit card) and must conduct transactions on a cash basis. Accordingly, customers need an alternative system and method that allows them to make a payment to the utility company that can be immediately posted to the customer's account.

Aspects of the present disclosure relate to such systems and methods. In particular, aspects of the present disclosure relate to systems and methods by which a utility company customer can pay their utility company bill at a point-of-sale (POS) system in a retail store or other merchant by presenting to the POS system a barcode or other such code (e.g., universal product code (UPC), QR code, or other similar codes) that contains information about the customer's account, including the amount due, or a referenceable index that allows the POS or payment processor/aggregator to look up the customer's account information and balance. The utility company can provide the barcode to the customer via email, text message, printed statement/invoice, or other media or communication as are suitable. In some embodiments, in addition to user account information, the barcode can include processor routing, utilities identification, vendor routing, and various other unique customer account or product information. In some embodiments, the barcode may be substituted with an electronic identification chip (e.g., a radio-frequency identification (RFID) chip on an identification card or Europay, MasterCard, Visa (EMV) chip, or otherwise on the customers themselves), which can be used to reference the customer's utility account.

As will be appreciated, allowing a customer to pay a utility company bill via a POS system at a retail store (e.g., a grocery store) allows the customer to pay their bill (including prepaying the account) in the customer's course of everyday business while they pay for the other goods they are purchasing from the retailer. In some embodiments, the utility customer can pay their bill while paying for their goods in a self-service checkout lane. But in some embodiments, a store clerk or representative may assist the utility customer with the checkout process.

In some embodiments, after the user (or checkout clerk) scans the barcode, the POS system recognizes information contained in the barcode and can forward the information included in the barcode to a server, where it can be processed. In some embodiments, processing the information may comprise applying rules to the information, which can include minimum payment amounts, balance amount due, past-due amounts and various other requirements or account information that may be necessary for the customer or POS system (or clerk) to complete the transaction. In some embodiments, the customer then provides payment to the POS system via cash, check, credit/debit card, or other acceptable forms of payment.

In some embodiments, the payment transaction is completed by typical POS system processes. The POS system can forward the transaction information to a server (e.g., a server maintained by a third-party on behalf of the utility company or to the utility directly). In some embodiments, the third-party server can act as a clearinghouse or payment infrastructure rails on behalf of the utility. In some embodiments, the server can then forward the transaction information to an account manager, which can be embodied in a third-party server or in a server maintained by the utility company. The account manager can update account information associated with the customer to reflect payment. In some embodiments, the account manager is the management system of record, and thus changes reflected therein are official account changes and updates. In some embodiments, an account manager can be embodied in a third-party server, and thus the account manager can transmit updates to a server maintained by the utility that embodies the utility company's official management system. Such customer account updates can occur in real-time or can be batched.

In some embodiments, the POS system can then generate a receipt and/or confirmation of the transaction, which can be printed at the checkout station, emailed to the customer, transmitted as a text message, or sent to the customer via other methods of communication (e.g., automated telephone call).

In some embodiments, a customer's payment may trigger additional required actions. For example, a customer's payment can trigger the utility company to reestablish the customer's service. Accordingly, in some embodiments, the results of the payment process can trigger subsequent events. For example, in some embodiments, upon receiving confirmation of payment, the POS system could be configured to transmit a message to a service meter or other switching device instructing the meter to reconnect service. Similarly, the POS system could send a message through a communication platform (e.g., cellular, mesh network, power-line carrier, automated metering infrastructure (AMI), gateway, enterprise service bus, meter data management system (MDM), or other suitable communications platform) that includes an appropriate command to reconnect the respective utility service. In some embodiments, upon confirmation of restoration of service, the third-party server may generate and send a notification to the customer via, for example, text message, email, or other communications methods.

In the following description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; and a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.,) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components.

According to an example implementation, the computing device architecture 100 includes a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
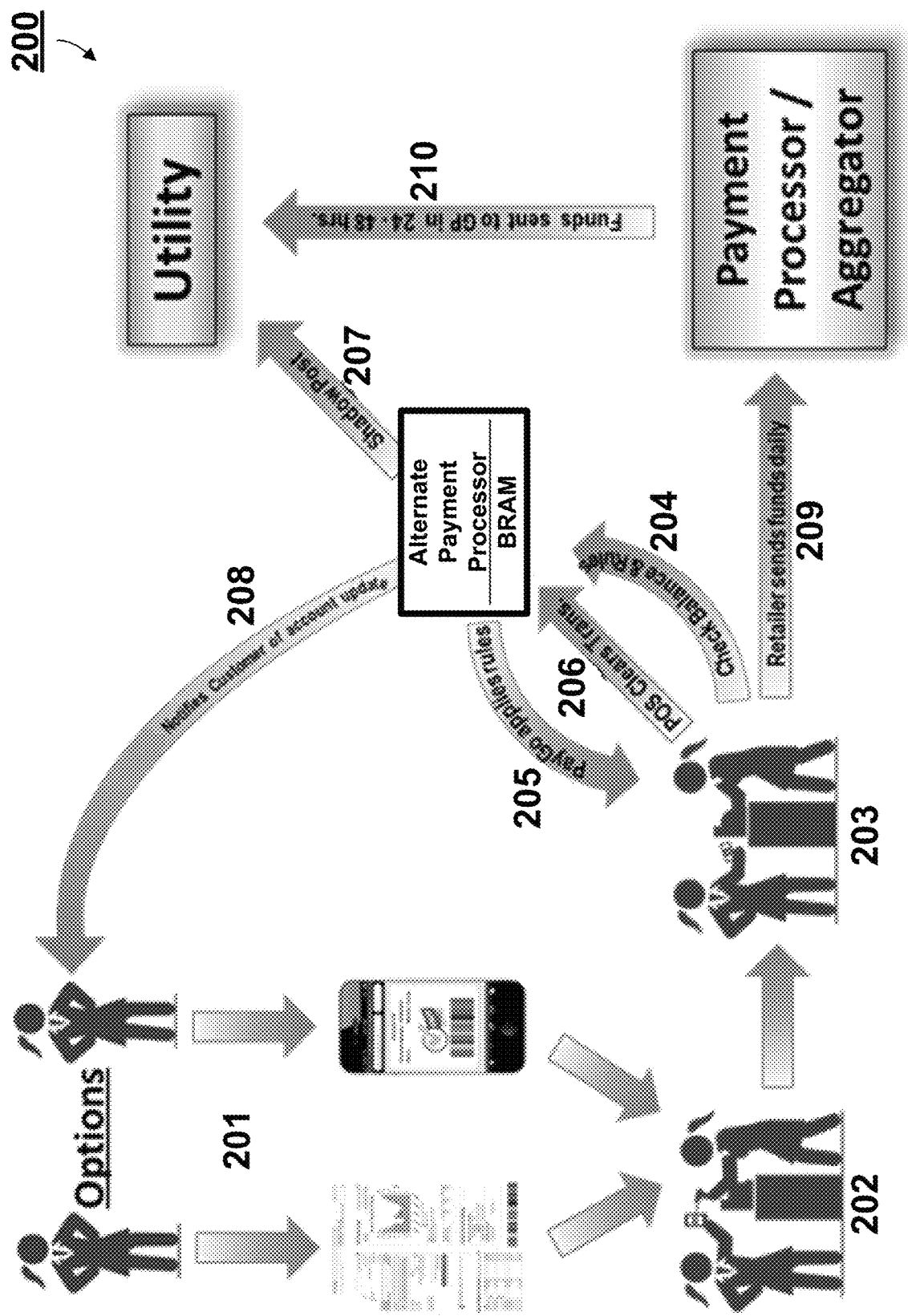
FIG. 2 is an overview of an environment 200 in which a utility company customer utilizes an alternate payment processor to make a payment to the utility company in accordance with an embodiment of the present disclosure.

FIG. 2 illustrates an overview of an environment 200 and various components in which aspects of the present disclosure can be practiced. As shown in FIG. 2, in some embodiments, a utility company customer ("customer") receives a paper bill or electronic bill that includes a barcode comprising information relating to the user's account, at 201. The barcode may be a UPC barcode, which can include a product number that references the utility company or the user's account. Further, in some embodiments, the barcode can include, for example, a payment processor (i.e., a third party payment processor); a utility identification number to further identify the utility from which the bill was received; a third-party retailer (e.g., a retailer capable of receiving payment from the customer); a code that indicates to the POS system that the barcode relates to a utility-type payment and should be routed to an alternated set of servers or processing rails that will provide to the POS system instructions and/or account/utility information; a business rule applications manager (BRAM), which can be a third-party or a party of the utility.

In some embodiments, the barcode identifies the ensuing transaction as a payment for an electrical, water, sewer, gas, lighting, communications (phone, messaging, radio), cable or satellite television, or other utility. The barcode also may identify other products or services provided by the utility such as water heaters, thermostats, energy efficiency services, repair services, or other products or offerings. The barcode may further identify various other specifications or information as specified by the company (i.e., utility) benefitting from the payment. The barcode may further identify other companies involved in the processing of the payment, in some embodiments.

In some embodiments, the barcode does not contain a customer's actual account number, but instead comprises a unique identifier that is associated with the customer's account by an alternate payment processor. Thus, the customer's actual account is not disclosed in the POS system process. In some embodiments, the payment processor/aggregator, the BRAM, or the utility may maintain the customer account information and the association to the unique identifier in an encrypted database for security purposes.

As shown in FIG. 2, in some embodiments, the customer may present to a checkout clerk (or to a self-service scanner) the barcode, which can be scanned in the same manner as, for example, the barcode on a grocery item or other retail item, at 202. The customer may present the barcode received from the utility in addition to various other retail items, or the customer can present the barcode by itself. Further, the customer can present the barcode at any point in the transaction according to the retailer's (or POS system's) preferences. The customer can present the actual paper bill, which includes the barcode, or the customer may access the barcode on a computing device and present the electronic version of the barcode, which may have been received via email, text message, or photographic image, for example.

In some embodiments, instead of a barcode, a customer may present a customer reference number ("CRN") that is issued by the utility system to the POS system. In some embodiments, a CRN can be a number assigned to the customer and can be indexed or mapped to the customer's account in the same manner as a barcode, an EMV chip, an RFID chip, or other transmitter/receiver device on the customer's person. Further, in some embodiments, a CRN can be printed on, for example, a plastic card (similar to a credit card), a plastic key ring index card, a government-issued identification card/device, or other item that can be presented to the POS system. In some embodiments, the CRN may be used for security purposes.

In some embodiments, once the POS system scans the barcode (or CRN) at 202 in FIG. 2, the payment request associated with the barcode may be routed to a server that can apply certain business rules (e.g., verification and validation rules) associated with the customer's account to the payment request, as shown in FIG. 2 at 204. As used herein, the server can be referred to alternatively as a "payment processor" and/or "payment aggregator." For example, in some embodiments, a Business Rule Applications Manager ("BRAM") embodied on the server (i.e., payment processor, payment aggregator) may provide the ability to apply certain rules to the payment request. Though the present embodiment is described as having a BRAM embodied on the payment processor, it is to be understood that in some configurations, a BRAM can be embodied on a server maintained by the utility.

According to some embodiments, for example, the business rules may indicate that the customer is on a specific rate plan such as a time-of-use (TOU), levelized payment plan (LPL), or budget billing plan (BBP), any of which may incur certain rate/payment restrictions. Additional business rules may restrict immediate reestablishment of service and only allow the meter to be armed for future reconnection by the customer after the customer has assured a safe environment at the location where the utility is to be reconnected. Other business rules may require that the customer has established a valid service agreement with the utility, that the service address has a valid certificate of occupancy, or that all utility service delivery equipment has been upgraded and/or meets current standards and government requirements. Additional business rules may require confirmation or validation that the service meter has two-way remote communications and a remote disconnect/reconnect capability. In some embodiments, business rules may specify whether a transactional fee or convenience fee is to be added to the payment amount. Additional business rules may require the system to evaluate the customer's payment record, which may include evaluating repeated chargebacks on credit/debit cards, insufficient funds payments, and the like, which may then require the customer to pay with cash only.

Additionally, according to some embodiments, for example, the business rules may indicate that a user is two months behind on payments and must pay at a minimum the previous balance and possibly the current balance or service will remain terminated. Further, in some embodiments, the business rules may indicate that a prepay account requires a minimum payment greater than the payment amount indicated by the customer to prevent the account from going into arrears because service charges related to the payment would diminish the proposed payment such that it would not be sufficient to bring the account above the pre-agreed minimum amount.

Thus, as will be appreciated, in some embodiments, after certain business rules are applied to a payment request, the POS system (or cashier, i.e., retail agent) may receive additional information (i.e., pertinent customer and/or utility information) relating to the customer's payment, as shown at 205 in FIG. 2, from the payment processor. For example, in some embodiments, a customer may be required to pay an additional transaction fee (i.e., service fee), which may be required by the retailer for providing utility payment access via the retailer's POS system.

In some embodiments, the POS system or the retail agent can ask the customer the amount of the payment to be applied to the account. For example, in some embodiments, an interactive terminal such as a credit card verification keypad, screen, or other customer interface device can be utilized to allow the customer to input a payment amount. In other words, in some embodiments, the utility payment may be in conjunction with other items being purchased at the same time or as a separate transaction for the utility payment only. Further, in some embodiments, a user could utilize a mobile computing device such as a smart phone to communicate the desire payment amount. In some embodiments, the payment amount can be applied strictly to the utility payment, or the user could specify a total payment amount to be applied to the utility account as well as the user's retail purchases. In some embodiments, the user may be able to make a payment using cash, credit/debit cards, general purpose reloadable gift cards, checks, Automated Clearing House (ACH), vouchers, rewards cards, bitcoins, Apple Pay, PayPal, Google Wallet, or any other current market-available payment method. As will be understood, in some embodiments, the POS system or retail agent can receive the customer's payment after scanning the barcode or CRN. Alternatively, the POS system may receive the utility customer's payment after receiving additional information relating to the customer's account after the various business rules are applied.

In some embodiments, to protect customer utility account information, and for privacy purposes, the POS system or endpoint may not be provided with actual customer account information, but instead may receive indications of whether the transaction may be accepted or not. For example, the POS system may merely receive an indication that the transaction is rejected if the submitted payment amount is not sufficient, for example, based on the business rules. In some embodiments, information regarding the transaction, such as balances, payment requirements, or the like, may be provided directly to the customer (for example, via SMS/MMS message, email, or the like) and not disclosed to the retail agent.

In some embodiments, the POS system and/or the alternate payment processor may be able to send notices, account situational awareness messages, or instructions to the customer via the credit/debit card pin pad at the checkout lane. As will be appreciated, such functionality can establish a real-time privacy interaction with the customer. Such messages may indicate account balance, minimum amount to be paid, or other private customer account information.

In some embodiments, the POS system and the alternate payment processor may be able to apply coupons or rewards as part of the transaction. For example, the utility or payment processor may provide coupons or reward incentives to the utility customer that may be redeemed during the payment transaction at particular retailers. In addition, the retailer may offer electronic coupons or other benefits as a result of the customer paying their utility bill at the POS. These coupons may be for current purchases being made at the same time as the utility payment or may be in the form of retailer loyalty points or other discounts offered by the retailer. Furthermore, some aspects of the disclosed embodiments may interface with the retailer's coupon program to identify the retailer's nearby store locations when the customer is searching for a participating checkout location and then communicate to the customer that certain electronic discounts or coupons would be available to the customer if they choose the participating retailer to make the utility payment.

According to some embodiments, after the customer confirms to the POS system or the retail agent the total amount of the payment (included in or independent from any other transactions or purchases), the POS system can submit the payment transaction to the payment processor at 206, which can process the transaction (e.g., through a banking system). In some embodiments, after processing the payment, the payment processor can forward the confirmation to the BRAM, which can then generate a credit (e.g., shadow post) that can be forwarded to the utility and posted to the customer's account, at 207. In some embodiments, this credit can be posted to the user's account in real time. Further, according to some embodiments, the BRAM can generate a payment confirmation/verification, at 208, which can be sent to the utility customer. For example, in some embodiments, a BRAM can generate a confirmation that can be sent to the customer as an SMS message, MMS message, email, or other suitable communication form to which the customer has access. Further, in some embodiments, the BRAM can generate a receipt that can be printed at the POS system (or emailed or sent via SMS or MMS) to provide further confirmation to the customer that the payment was applied to the customer's account.

In some embodiments, after payment is received, the retailer or the retailer's POS system can transfer funds to the payment processor at 209, which can then aggregate funds from various retailers and transmit the aggregated funds to the utility company on an as-agreed basis (e.g., daily) at 210.

As noted, in some embodiments, a customer's payment may trigger additional required actions by the utility company. For example, a customer's payment can trigger the utility company to reestablish the customer's service. In such instances, related interfaces or customer interactions can be incorporated as part of the disclosed payment process. For example, in some embodiments, an "arming button" could be incorporated into the user interface with which the utility customer interacts at the POS system. In some embodiments, an arming button can allow the customer to acknowledge that a disconnected service for non-payment is now ready to be reconnected, and the arming button can further allow the customer to connect the service using the arming button. In some embodiments, the arming button may be accessible via the user's mobile computing device, or the user's response to a text message could constitute use of the arming button. In some embodiments, an additional interaction could be an instruction for the customer to contact the utility company for additional information, to complete a survey, or the like.

Figure 3:
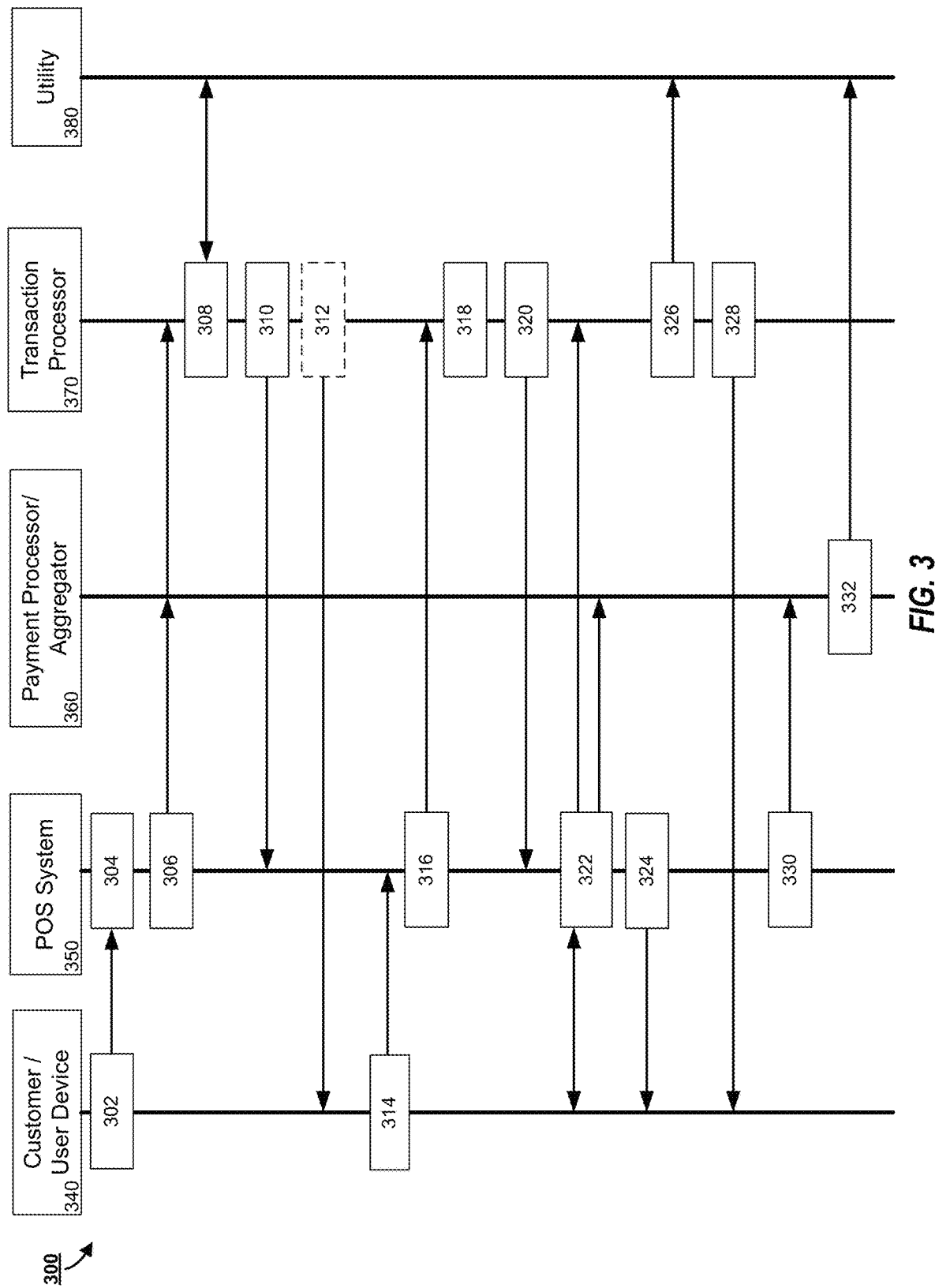
FIG. 3 illustrates an example communication flow 300 for an alternate payment processing method in accordance with an embodiment of the present disclosure.

FIG. 3 illustrates an example communication flow 300 for an alternate payment processing method in accordance with an embodiment of the present disclosure. As shown in FIG. 3, communications may flow between a customer 340, a POS system 350, a payment processor/aggregator 360, an alternate payment processor (transaction processor) 370, and a utility company 380, to process customer utility payments in accordance with an example embodiment of the present disclosure. As discussed above, a utility customer 340 may receive a barcode, or other type of encoded indicia, from the utility company to facilitate payments on the customer's account. The customer 340 may present 302 the barcode to a retail agent (e.g., checkout clerk, self-service scanner, etc.), either in physical form (e.g., a utility bill statement) or electronic form (e.g., displayed on the customer's mobile device). The customer's barcode may then be scanned 304 by the retail POS system (e.g., clerk or self-service scanner). The POS system 350 may transmit 306 the scanned barcode data to a payment processor/aggregator 360 and/or a transaction processor 370. In some embodiments, the POS system 350 may transmit the scanned barcode data to a payment processor/aggregator 360, and the payment processor/aggregator 360 may then transmit the data to a transaction processor 370.

The transaction processor 370 may then look up (i.e., retrieve) 308 the utility customer account associated with a unique identifier provided in the scanned barcode data. For example, the transaction processor 370 may maintain database, which may be encrypted, associating barcode unique identifiers with utility customer accounts. The transaction processor 370 may then verify the customer account with the utility 380, for example verifying that the account is still valid and verifying any balance due amounts for the account. The transaction processor 370 may also look up (or retrieve) any business rules established by the utility 380 (or transaction processor 370) for the payment process. The transaction processor 370 may apply 310 any identified business rules to the payment transaction, for example, required service fees or the like, and generate and send response data to the POS system 350 to continue the payment transaction. Optionally, the transaction processor 370 may send 312 customer account information (e.g., current/past due balances, payment requirements, or the like) to the customer 340. In some embodiments, the transaction processor 370 may send the customer account information to a terminal of the POS system that can be accessed by the customer directly, e.g., a credit/debit PIN pad or the like.

The customer 340 may indicate 314 to the POS system 350 the amount that they wish to pay toward their utility account, as detailed above. For example, the customer may inform the checkout clerk of the amount or may enter the amount on a retail payment terminal of the POS system 350. The POS system 350 may transmit 316 the payment amount data to the transaction processor 370. The transaction processor 370 may then apply 318 business rules (e.g., business rules retrieved at 308) to verify that the submitted payment amount meets all the requirements of the utility company (e.g., minimum payment amounts or the like). The transaction processor 370 may then transmit 320 either a confirmation or rejection of the payment transaction to the POS system 350 based on the business rules processing.

For example, if the submitted payment data does not satisfy the rules established by the utility 380, the transaction processor 370 may send a rejection to the POS system 350 indicating that the transaction cannot be completed as submitted, and the process may stop, or may allow the customer 340 to submit an alternate payment amount that meets the requirements. In some embodiments, the transaction processor 370 may provide information about the payment requirements directly to the customer 340 (e.g., via SMS/MMS message, email, or the like), and not to the POS system 350, to protect customer privacy.

If the transaction processor 370 determines 318 that the payment data satisfies the business rules, the transaction processor 370 may send 320 a transaction confirmation to the POS system 350 such that the customer's transaction may be completed. The POS system 350 may complete 322 the customer's transaction. The transaction may include only the utility payment, or it may consist of other purchases in addition to the utility payment, as detailed above. The POS system 350 also may transmit 322 data regarding completing the transaction to the payment processor/aggregator 360 and/or the transaction processor 370. The POS system 350 may provide 324 confirmation of the transaction to the customer 340 by, for example, printing a receipt as appropriate.

The transaction processor 370 may notify 326 the utility company 380 of the completed payment transaction for posting to the customer's utility account. The transaction processor 370 may generate and transmit 328 a payment confirmation/verification to the customer 340 via, for example, email or SMS/MMS message. The POS system 350 may transmit 330 the customer payments to the payment processor/aggregator 360, which may then forward 332 the payments to the utility company 380.

Figure 4:
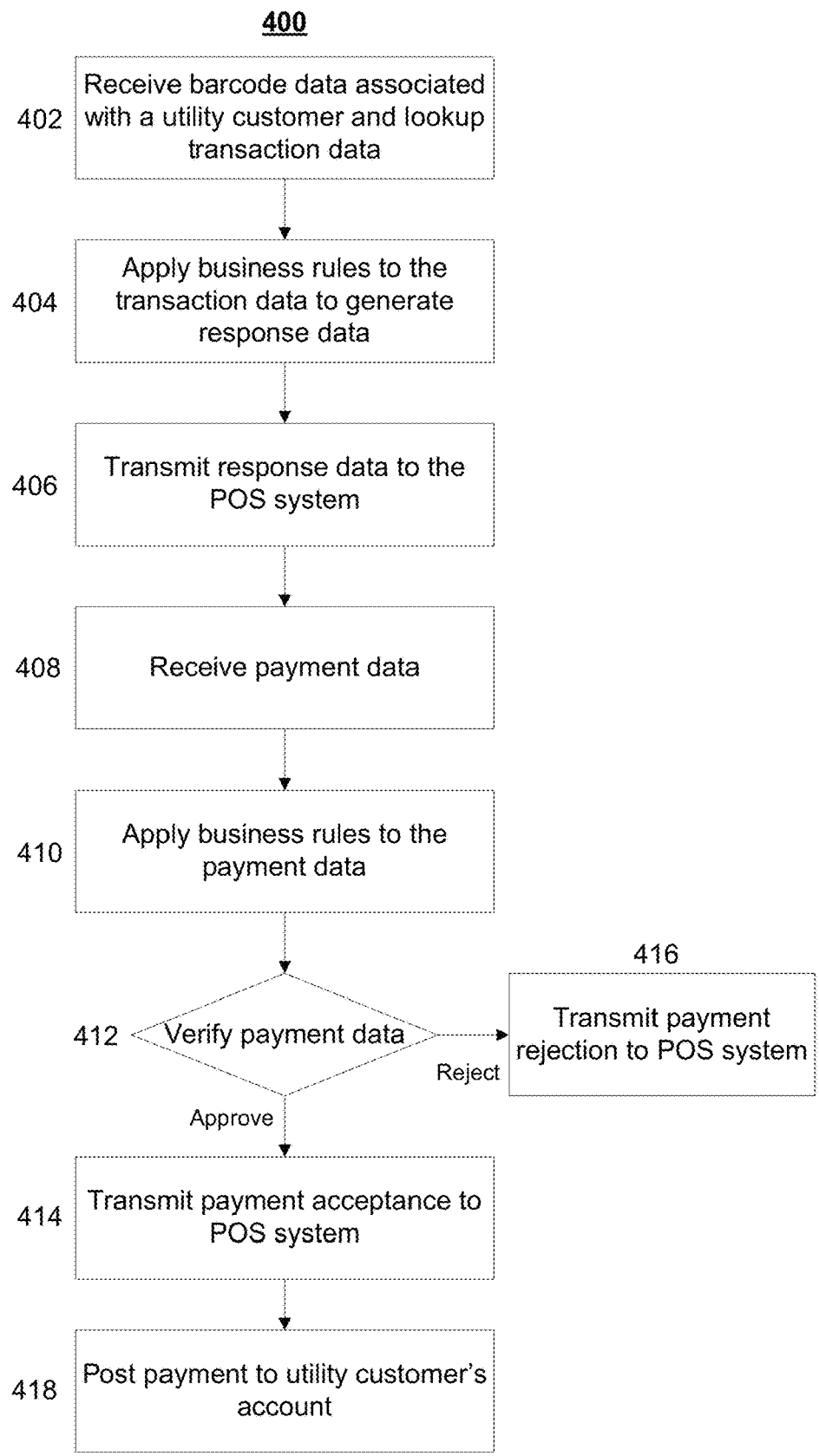
FIG. 4 illustrates an example method 400 performed by an alternate payment processor in accordance with an embodiment of the present disclosure.

FIG. 4 illustrates a flowchart 400 of example operations of an alternate payment processor in accordance with an embodiment of the present disclosure. Operations for accepting a utility customer's payment may begin at 402 when barcode data (or other coded indicia data) associated with the customer's utility account is received by an alternate payment processor from a POS system. The alternate payment processor may look up the customer account associated with a unique identifier contained in the barcode data and may verify the account and any processing rules with the utility company. The alternate payment processor may apply, at 404, any business rules to the received barcode data including, for example, service fee requirements or the like, and generate response data, which may be transmitted to the POS system at 406.

The alternate payment processor may receive, at 408, payment amount data from the POS system. Payment amount data may include, for example, a payment amount indicated by the customer to a checkout clerk or via a POS payment terminal. The alternate payment processor may apply, at 410, any required business rules (e.g., minimum payment requirements or the like) to the received payment data, and verify that the customer payment may be accepted, at 412. If, at 412, the received payment data satisfies the business rules, processing may continue, as shown at 414, such that the alternate payment processor may transmit a transaction authorization to the POS system indicating that the payment may be accepted. The POS system may then complete the transaction and the alternate payment processor may receive a verification of the completed transaction from the POS system. The alternate payment processor may transmit, at 418, the customer payment transaction information to the utility company for posting to the customer's utility account.

If, at 412, the received payment data fails to satisfy the business rules, processing may continue to 416 where the alternate payment processor may transmit a transaction rejection to the POS system indicating that the payment may not be accepted and processing may stop. In some embodiments, the alternate payment processor may transmit information regarding the required payment, balances, or the like, to the customer via, for example, text message, email, or the like. In some embodiments, the customer may submit an alternate payment amount to the POS system and operations may revert back to 408 for further processing.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A device comprising:
at least one processor; and
at least one memory comprising computer program instructions that, when executed by the at least one processor, cause the device to:
receive, from a point of sale system and at a payment processor not affiliated with a utility account of a utility customer, scan data and transaction data associated with the utility customer, the scan data comprising data from a coded indicia generated by a utility company for the utility customer and configured for facilitating payments to the utility account of the utility customer, the data from the coded indicia including a unique identifier associated with the utility account of the utility customer, and the transaction data comprising requested payment data specifying a payment amount to be applied to the utility account of the utility customer;
apply business rules to the scan data and transaction data to determine validity of the scan data and transaction data;
responsive to determining that the scan data and transaction data is valid, transmit transaction acceptance data to the point of sale system; and
responsive to determining that the scan data or payment data is not valid, transmit transaction rejection data to the point of sale system.

2. The device according to claim 1 further comprising computer program instructions that, when executed by the at least one processor, cause the device to:
retrieve customer account data associated with the unique identifier data;
based on the scan data, retrieve one or more required rules; and apply the business rules to the scan data and payment data based at least in part on the customer account data and the one or more required rules.

3. The device according to claim 1 further comprising computer program instructions that, when executed by the at least one processor, cause the device to:
receive, from the point of sale system, transaction completion data; and
transmit, to a utility company server, customer account update data.

4. The device according to claim 3 further comprising computer program instructions that, when executed by the at least one processor, cause the device to:
transmit a payment confirmation to the utility customer, wherein the payment confirmation comprises one or more of:
a short message service message;
a multimedia messaging service message;
an email message; and
a telephone message.

5. The device according to claim 1 wherein applying business rules to the transaction data comprises one or more of:
determining the transaction data meets a minimum payment requirement;
determining the transaction data meets a balance due payment requirement;
determining the transaction data meets an arrears payment requirement;
determining the transaction data meets a rate plan requirement; and
determining a transaction service fee requirement.

6. The device according to claim 1 further comprising computer program instructions that, when executed by the at least one processor, cause the device to:
based at least in part on applying the business rules to the transaction data, transmit customer account data to at least one of the point of sale system or a customer device.

7. A system comprising:
a payment processor server; and
a point of sale system comprising:
at least one processor; and
at least one memory comprising computer program instructions that, when executed by the at least one processor, cause the point of sale system to:
generate scan data and transaction data associated with a utility customer, wherein (i) the scan data comprises data from a coded indicia generated by a utility company for the utility customer and configured for facilitating payments to a utility account of the utility customer, the data from the coded indicia including a unique identifier associated with the utility account of the utility customer, and (ii) the transaction data comprises requested payment data specifying a payment amount to be applied to the utility account of the utility customer;
transmit the scan data and transaction data to the payment processor server; and
receive response data from the payment processor server;
the payment processor server comprising:
at least one processor; and
at least one memory comprising computer program instructions that, when executed by the at least one processor, cause the payment processor server to:
receive, from the point of sale system, the scan data and the transaction data associated with the utility customer;
apply business rules to the scan data and transaction data to determine validity of the scan data and transaction data;
responsive to determining that the scan data and transaction data is valid, transmit response data to the point of sale system comprising a transaction acceptance; and
responsive to determining that the scan data or transaction data is not valid, transmit response data to the point of sale system comprising a transaction rejection.

8. The system according to claim 7, the payment processor server further comprising computer program instructions that, when executed by the at least one processor, cause the payment processor server to:
retrieve customer account data associated with the unique identifier data;
based on the scan data, retrieve one or more required rules; and
apply the business rules to the scan data and payment data based at least in part on the customer account data and the one or more required rules.

9. The system according to claim 7, the payment processor server further comprising computer program instructions that, when executed by the at least one processor, cause the payment processor server to:
receive, from the point of sale system, transaction completion data; and
transmit, to a utility company server, customer account update data.

10. The system according to claim 9, the payment processor server further comprising computer program instructions that, when executed by the at least one processor, cause the payment processor server to:
transmit a payment confirmation to the utility customer, wherein the payment confirmation comprises one or more of:
a short message service message;
a multimedia messaging service message;
an email message; and
a telephone message.

11. The system according to claim 7 wherein applying business rules to the transaction data comprises one or more of:
determining the transaction data meets a minimum payment requirement;
determining the transaction data meets a balance due payment requirement;
determining the transaction data meets an arrears payment requirement;
determining the transaction data meets a rate plan requirement; and
determining a transaction service fee requirement.

12. The system according to claim 7, the payment processor server further comprising computer program instructions that, when executed by the at least one processor, cause the payment processor server to:
transmit customer account data, based at least in part on applying the business rules to the transaction data, to at least one of the point of sale system or a customer device.

13. A method comprising:
receiving, from a point of sale system and at a payment processor not affiliated with a utility account of a utility customer, scan data and transaction data associated with the utility customer, the scan data comprising data from a coded indicia generated by a company for the utility customer and configured for facilitating payments to the utility account of the utility customer, the data from the coded indicia including a unique identifier associated with the utility account of the utility customer, and the transaction data comprising requested payment data specifying a payment amount to be applied to the utility account of the utility customer;

applying business rules to the transaction data to determine validity of the transaction data;

responsive to determining that the transaction data is valid, transmitting transaction acceptance data to the point of sale system; and responsive to determining that the transaction data is not valid, transmitting transaction rejection data to the point of sale system.

14. The method according to claim 13 further comprising:
retrieving customer account data associated with the unique identifier data;
based on the scan data, retrieving one or more required rules; and
applying the business rules to the transaction data based at least in part on the customer account data and the one or more required rules.

15. The method according to claim 13 further comprising:
receiving, from the point of sale system, transaction completion data; and
transmitting, to a utility company server, customer account update data.

16. The method according to claim 15 further comprising:
transmitting a payment confirmation to the utility customer, wherein the payment confirmation comprises one or more of:
a short message service message;
a multimedia messaging service message;
an email message; and
a telephone message.

17. The method according to claim 15 wherein transmitting customer account update data to the utility company server comprises one of:
transmitting a shadow post to a customer utility account; or
transmitting a direct post to the customer utility account.

18. The method according to claim 13 wherein applying business rules to the transaction data comprises one or more of:
determining the transaction data meets a minimum payment requirement;
determining the transaction data meets a balance due payment requirement;
determining the transaction data meets an arrears payment requirement;
determining the transaction data meets a rate plan requirement; and
determining a transaction service fee requirement.

19. The method according to claim 13 further comprising:
based at least in part on applying the business rules to the transaction data, transmitting customer account data to at least one of:
the point of sale system; and
a customer device.

20. The method according to claim 13 wherein receiving scan data comprises:
receiving data acquired from a scan, by the point of sale system, of the coded indicia provided by the utility customer, the data comprising a unique identifier and at least one of:
transaction processor routing data;
utility identification data; and
vendor routing data.

\* \* \* \* \*